United States Patent
Arletti et al.

(10) Patent No.: US 6,861,385 B2
(45) Date of Patent: Mar. 1, 2005

(54) PROCESS FOR THE PREPARATION OF A SPHERICAL SUPPORT COMPRISING A MG DIHALIDE

(75) Inventors: Arrigo Arletti, Finale Emilia (IT); Anna Fait, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 95 days.

(21) Appl. No.: 10/182,037

(22) PCT Filed: Dec. 4, 2001

(86) PCT No.: PCT/EP01/14267

§ 371 (c)(1), (2), (4) Date: Oct. 7, 2002

(87) PCT Pub. No.: WO02/051544

PCT Pub. Date: Jul. 4, 2002

(65) Prior Publication Data

US 2003/0096699 A1 May 22, 2003

(30) Foreign Application Priority Data

Dec. 22, 2000 (EP) .......................................... 00204733
Aug. 3, 2001 (EP) .......................................... 01202958

(51) Int. Cl.$^7$ .............................................. B01J 31/00
(52) U.S. Cl. ....................... 502/150; 502/169; 568/851; 526/124.3; 526/124.5; 526/124.2
(58) Field of Search ................................. 502/150, 169; 568/851; 526/124.5, 124.2, 124.3

(56) References Cited

U.S. PATENT DOCUMENTS

| | | | |
|---|---|---|---|
| 4,315,874 A | | 2/1982 | Ushida et al. ................. 264/5 |
| 4,399,054 A | * | 8/1983 | Ferraris et al. ............. 502/125 |
| 4,469,648 A | * | 9/1984 | Ferraris et al. ................. 264/9 |
| 5,468,698 A | * | 11/1995 | Koskinen et al. ............... 502/9 |
| 5,500,396 A | | 3/1996 | Martin .......................... 502/8 |
| 6,020,279 A | * | 2/2000 | Uwai et al. ............... 526/124.2 |
| 6,127,304 A | * | 10/2000 | Sacchetti et al. ........... 502/125 |
| 6,268,443 B1 | * | 7/2001 | Uwai et al. ............... 526/124.2 |
| 6,323,152 B1 | * | 11/2001 | Sacchetti et al. ........... 502/169 |
| 6,388,028 B2 | * | 5/2002 | Sacchetti et al. ........ 526/124.3 |
| 6,407,028 B1 | * | 6/2002 | Sacchetti et al. ........... 502/169 |
| 6,437,061 B1 | * | 8/2002 | Sacchetti et al. ........ 526/124.2 |
| 6,544,920 B1 | * | 4/2003 | Pennini et al. ............. 502/120 |
| 6,686,307 B2 | * | 2/2004 | Sacchetti et al. ........... 502/169 |

FOREIGN PATENT DOCUMENTS

| | | | | |
|---|---|---|---|---|
| EP | 0129368 | | 12/1984 | ........... C08F/10/00 |
| EP | 0416815 | | 3/1991 | ............ C07F/7/10 |
| EP | 0420436 | | 4/1991 | ............ C07F/7/00 |
| EP | 0713886 | | 5/1996 | ........... C08F/10/00 |
| WO | 9623010 | | 8/1996 | ......... C08F/210/16 |

* cited by examiner

*Primary Examiner*—Mark L. Bell
*Assistant Examiner*—Jennine Brown

(57) ABSTRACT

A process for preparing spherical support particles used in the preparation of catalytic components for the polymerization of olefins by (a) forming an emulsion of an adduct of a Mg dihalide and a Lewis base compound in a liquid medium, and (b) cooling the emulsion by transferring it into a cooling bath containing a cooling liquid in motion wherein the cooling liquid is moving inside a tubular zone and the ratio $V_e/V_{ref}$ of the velocity ($V_e$) of the emulsion coming from step (a) to the velocity of the cooling liquid ($V_{ref}$) of step (b) is between 0.25 and 4. The resulting spherical support particles have a very narrow size distribution and particularly regular morphology.

29 Claims, 2 Drawing Sheets

PROCESS FOR THE PREPARATION OF A SPHERICAL SUPPORT COMPRISING A MG DIHALIDE

This application is the U.S. national phase of International Application PCT/EP01/14267, filed Dec. 4, 2001.

The present invention relates to a process for preparing a support, in the form of spherical particles with a narrow size distribution, which can be used in the preparation of olefin polymerization supported catalysts. In particular, the present invention relates to a process for preparing the said support, which involves forming an emulsion, in a liquid medium, of a molten adduct of magnesium dihalide and a compound belonging to the group of Lewis bases, followed by rapidly cooling the said emulsion, under suitably selected conditions, thus obtaining the solid adduct in the form of spheroidal particles. This process gives support particles whose morphology and size distribution are such that they make the particles particularly suitable for use in preparing supported olefin polymerization catalysts.

The availability of a support of spherical morphology with a narrow particle size distribution is a fundamental factor in avoiding problems of controlling the gas-phase polymerization process (formation of fines) and non-uniformity of the final polymeric product. The reason for this is that a support with these properties allows the preparation of a catalyst which reflects these properties and which in turn allows the preparation of polymers of high apparent density with good flow properties. These properties of the polymer not only allow the entire polymerization process to be controlled with ease, but also allow an improvement in possible treatments after preparation of the polymer, such as granulation, moulding, etc.

It is widely known in the art that catalytic components of the Ziegler/Natta type comprising a titanium compound supported on magnesium chloride in active form have high olefin polymerization activity, and, when these catalytic components comprise an electron-donating compound, they also have high stereospecificity. These catalysts are indeed those used most extensively in the polymerization of olefins such as ethylene, propylene, etc.

It is thus particularly advantageous to have available a process capable of producing a support comprising magnesium chloride directly in the form of spherical particles with a narrow distribution of diameters, which can then be used to prepare the catalytic component. A support with these properties would make it possible to avoid the subsequent step of classification and allow a substantial increase of the support production yields.

Supports comprising $MgCl_2$ can be prepared by many different processes. Some of these comprise the formation of a molten adduct of magnesium chloride and a Lewis base, followed by spraying in an atmosphere at low temperature (spray-cooling) so as to solidify the adduct. Alternatively, a solution of this adduct in a suitable solvent is sprayed in an atmosphere whose temperature is such that the solvent is instantaneously removed (spray-drying), thus allowing the formation of particles of solid adduct.

Another general method widely used in the preparation of spherical supports comprising $MgCl_2$ consists in melting the adduct described previously, with stirring, in a liquid medium in which the adduct is immiscible, and transferring the mixture into a cooling bath containing a liquid at low temperature, in which the adduct is insoluble, which is capable of bringing about rapid solidification of the adduct in the form of spheroidal particles. The results obtained both in terms of morphology and in terms of size dispersion depend on the parameters selected in the various stages of the process. This is why the various attempts proposed for improving the process generally involve the specific selection of a number of control parameters.

One method proposed, for example, is described in patent U.S. Pat. No. 4,469,648. The said method involves (a) forming a homogeneous mixture of an $MgCl_2 \cdot$alcohol adduct in molten form and a liquid which is immiscible with the said adduct in a ratio such that the molten adduct forms the disperse phase, (b) subjecting the mixture to a turbulent flow in order to obtain an emulsion, and (c) rapidly cooling the emulsion to solidify the disperse phase and collecting the solid adduct particles. In particular, the emulsion is obtained by passing the homogeneous mixture through a tube 50–100 times longer than its inside diameter under turbulent flow conditions (Reynolds number greater than 3000). In addition, the linear velocity of the emulsion in the tube and the surface tension between the pure adduct and the immiscible liquid are said to be determining factors as regards the size of the spherical adduct particles. The emulsion obtained from the transfer tube is then discharged into a cooling bath containing a cooling liquid in motion. As the description of the apparatus shows, the cooling liquid moves in a turbulent way under the action of a stirrer. The ratio of the velocity of the emulsion leaving the transfer tube to the velocity of the cooling liquid is not defined, and the disclosure does not mention the effect of this ratio on the final properties of the product.

U.S. Pat. No. 4,399,054 describes $MgCl_2 \cdot$EtOH adducts, which can be used as supports for catalyst components, which are obtained by forming an emulsion of the adduct with a liquid with respect to which the said adduct is immiscible and inert, followed by rapidly cooling the emulsion, thus allowing immediate solidification of the adduct. The emulsion can be obtained by working according to the method described in U.S. Pat. No. 4,469,648 (by passing the homogeneous mixture through a tube under turbulent flow conditions) or by working in a mixer with vigorous stirring. The operating conditions used in the cooling stage are not specified in either case. In particular, the ratio of the velocity of the emulsion to the velocity of the cooling liquid is not defined, nor is the angle formed by the direction of entry of the emulsion into the bath and by the direction of flow of the cooling liquid. In addition, the results obtained in terms of size distribution are not entirely satisfactory.

U.S. Pat. No. 5,500,396 describes a process for preparing spherical particles of $MgCl_2 \cdot$alcohol adduct in a liquid with a viscosity of greater than 50 cSt at 40° C., which involves heating the mixture with continuous stirring and finally cooling it to obtain the adduct in the form of solid particles. The cooling is carried out in the same reactor in which the $MgCl_2 \cdot$alcohol adduct in molten form was prepared, while bringing the temperature gradually to 40° C. by using a jacketed reactor in which a cooling fluid is circulated. By virtue of the intrinsic properties of the high-viscosity liquid and probably also of the long cooling times (of the order of minutes), the experimental conditions are not readily controllable, as a result of which, as is seen from the data reported in the examples, this process leads to results that are not always reproducible and not always optimal in terms of either size distributions or morphology. In addition, given the operating conditions (the entire process is carried out in a single reactor), performing the process on an industrial scale as a continuous process would be highly problematical.

U.S. Pat. No. 4,315,874 describes a process for preparing an MgCl2·EtOH adduct in the form of spherical particles, which involves (a) forming a suspension of molten drops of adduct in a liquid medium, in the presence of a surfactant, and (b) transferring the said suspension, by means of a transfer tube, into a cooling bath in order to solidify the adduct particles. In this case also, the ratio of the velocity of the emulsion to the velocity of the cooling liquid is not defined, nor is the angle formed by the direction of entry of the emulsion into the bath and by the direction of flow of the cooling liquid. Good results in terms of particle size distribution are obtained only in the presence of surfactant.

From the results above described, it is clearly seen that attention has been focused almost exclusively on the parameters relating to the stage of preparation of the emulsion containing $MgCl_2$·alcohol as dispersed phase and to the stage relating to the transfer of the emulsion to the cooling step in the conviction that the results of the process of preparation of support particles depend exclusively on controlling the steps of preparation and transfer of the emulsion.

However, the Applicant found that in order to obtain the solidification of the droplets without any relevant modification of the particle size distribution (PSD) and spherical shape obtained in the liquid phase, the quenching step results of primary importance.

It has now been found, unexpectedly, that by appropriately controlling a number of fluid dynamic parameters in the cooling stage, it is possible to obtain the said solid particles with excellent morphological properties and narrow size distribution. In particular, it should be noted that these excellent results are obtained even without the use of a surfactant.

It has thus been found, entirely surprisingly, that by appropriately selecting a number of process parameters in the stage of rapid cooling of the adduct/liquid medium mixture, considerable improvements are obtained in terms of the morphology and size distribution of the support particles.

Figure 1:
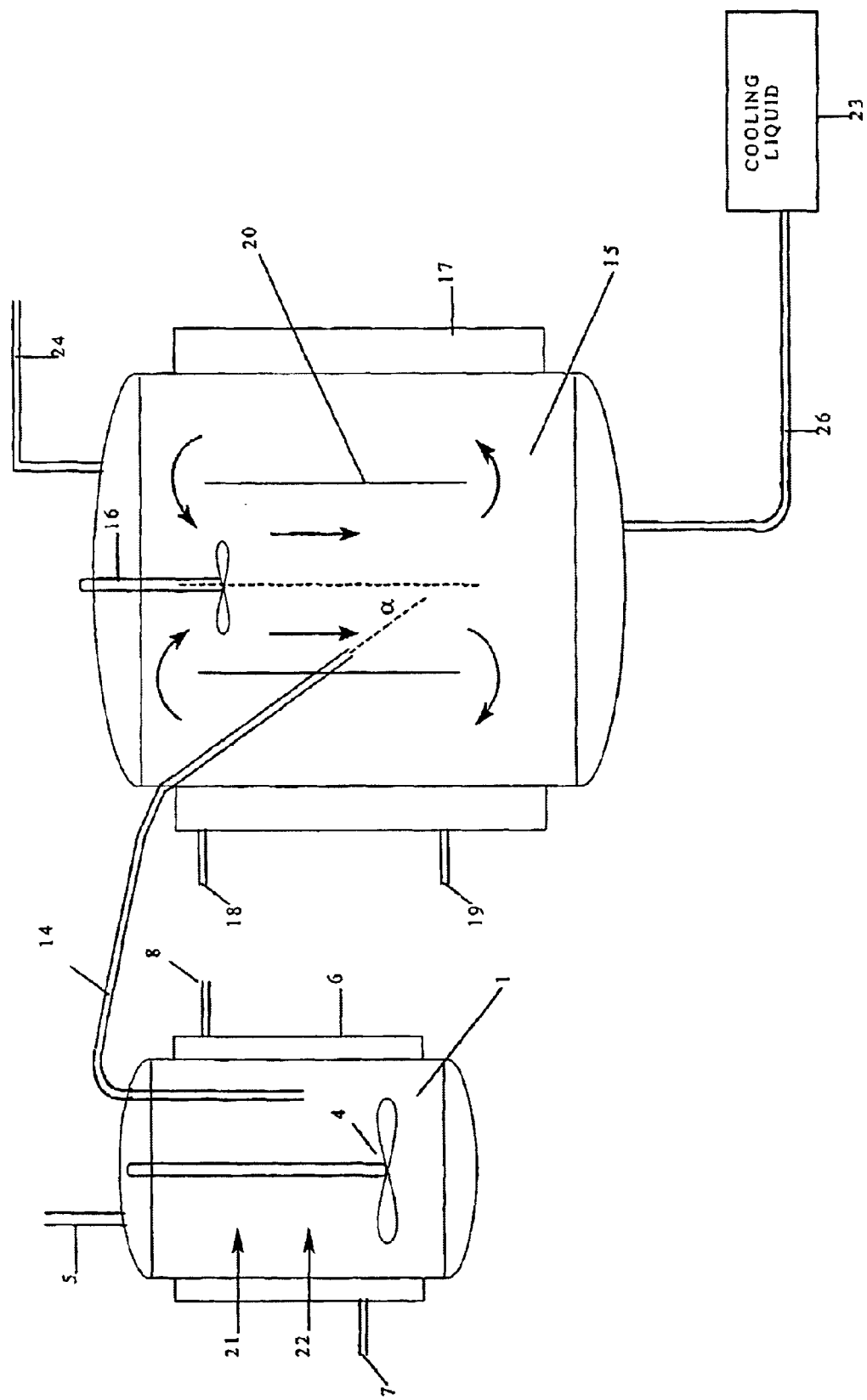
FIG. 1 illustrates a process flow diagram for a process to prepare spheroidal support particles.

An object of the present invention is thus a process for preparing spheroidal support particles, which can be used in the preparation of catalytic components for the polymerization of olefins, comprising the steps of:
(a) forming an emulsion of an adduct of a Mg dihalide and a Lewis bases, in a liquid medium which is inert with respect to the adduct;
(b) cooling the emulsion by transferring it into a cooling bath containing a cooling liquid in motion;
the process being characterized in that the cooling liquid is moving inside a tubular zone and the ratio $V_e/V_{ref}$ of the velocity of the emulsion ($V_e$) coming from step (a) to the velocity of the cooling liquid ($V_{ref}$) is between 0.25 and 4, preferably between 0.5 and 2, more preferably between 0.75 and 1.5.

In the process of the present invention, with the term "velocity of the emulsion" ($V_e$) is intended the ratio between the volumetric rate of the emulsion and the section of the tube conveying the emulsion inside the cooling bath.

With the term "velocity of the cooling liquid" ($V_{ref}$) is intended the ratio between the volumetric rate of the cooling liquid and the section of the tubular zone conveying the cooling liquid inside the cooling bath.

Without wishing to be confined by any interpretation or theory, one of the possible explanations for the excellent results obtained may be sought in the accurate control of the conditions in the stage of cooling to which the droplets of the molten adduct are subjected. The reason for this is that in this stage, the droplets are still in molten form and therefore they are not only easily deformable, but also have adhesive properties. Consequently, the conditions under which the cooling of the droplets takes place will have to be selected so as to avoid phenomena such as aggregation and stretching which result in broadening of the size distribution and undesired morphologies.

The products obtained by the process of the present invention have shown excellent properties in terms of particle size distribution and, above all, in term of morphological properties.

It has been ascertained that a further improvement in the results of the process of the present invention can be obtained by allowing the emulsion entering the cooling bath at an angle α, which is less than 45°. The angle α is defined as the angle formed by the direction of entry of the emulsion into the cooling bath and by the direction of flow of the cooling liquid inside the tubular zone. Particularly good results are obtained when the said angle α is less than 35° and preferably less than 20°.

Another particularly preferred aspect is that of carrying out the process by combining values for the angle α of less than 20° with values for the ratio $V_e/V_{ref}$ of between 0.75 and 1.5 and more preferably of unity.

The liquid medium used in stage (a) can be any liquid medium which is inert with respect to, and substantially immiscible with the adduct of Mg dihalide. Preferably, it is an organic liquid medium in particular selected from the group consisting of aliphatic and aromatic hydrocarbons, silicone oils, liquid polymers or mixtures of the said compounds. Particularly preferred liquid media are paraffin oils and silicone oils having a viscosity of greater than 20 cSt at room temperature and preferably between 30 cSt and 300 cSt.

The Lewis base forming the adduct with the Mg dihalide is preferably selected from the group consisting of amines, alcohols, esters, phenols, ethers, polyethers and aromatic or aliphatic (poly) carboxylic acids. Among them, particularly preferred are the alcohols of formula ROH in which R is an alkyl group containing from 1 to 10 carbon atoms.

The use of $MgCl_2$ as a Mg dihalide is preferred.

Especially preferred adducts are those of formula $MgCl_2 \cdot mROH \cdot nH_2O$ in which m ranges from 0.1 to 6, n ranges from 0 to 0.7 and R has the meaning given above. Among them the adducts particularly preferred are those in which m ranges from 2 to 4, n ranges from 0 to 0.4 and R is ethyl.

According to the present invention the particle size distribution is calculated with the formula $$\frac{P90 - P10}{P50}$$

where, in a particle size distribution curve, P90 is the value of the diameter such that 90% of the total particles have a diameter lower than that value; P10 is the value of the diameter such that 10% of the total particles have a diameter lower than that value and P50 is the value of the diameter such that 50% of the total particles have a diameter lower than that value.

In the particular case of adduct of formula $MgCl_2 \cdot mROH \cdot nH_2O$ in which m ranges from 0.1 to 6, n ranges from 0 to 0.7 and R is an alkyl group containing from 1 to 10 carbon atoms, the process of the invention allows to obtain a particle size distribution according to the formula $$\frac{P90-P10}{P50}$$

of less than 1.1, as shown by the working examples.

As regards the spherical morphology, the process of the present invention allows to obtain particles having a ratio between maximum diameter and minimum diameter of less than 1.5 and preferably of less than 1.3.

It is possible to obtain a further improvement in the control of the size distribution and of the morphological properties of the support by also controlling the process conditions of the formation of the emulsion (stage a). The formation of the emulsion may be carried out in a mixer, such as for example a static mixer, a rotor-stator mixer or a vessel equipped with a stirring system. In the latter case, for the purpose of forming and maintaining the emulsion it is preferable to work in stage (a) under conditions such that the value $\lambda_k$ of the emulsion ranges from 5 µm to 150 µm and more preferably from 40 µm to 130 µm. This parameter, in accordance for example with the description in the book "Mixing in the process industries" by N. Harnby, is defined by the formula $\lambda_k=(V^3/\ni)^{1/4}$ in which V is the kinematic viscosity of kinematic viscosity of the adduct/liquid medium mixture and $\ni$ is the energy supplied by the stirring system. In calculating the value of $\lambda_k$ according to the present invention, the term $\ni$ is replaced by the power (P) supplied by the stirrer to the system.

In accordance with what is known, but without wishing to be bound in any way by this theory, the parameter $\lambda_k$ refers to the fluid dynamic properties of the emulsion by establishing a general relationship between the intrinsic physical properties of the system, the energy supplied thereto and a number of properties of the emulsion which can be obtained. In general, the value of $\lambda_k$ is related to the sizes of the droplets in the disperse phase which form the emulsion, such that higher values of $\lambda_k$ correspond to larger average diameters of the droplets in the disperse phase, and vice versa.

It has been found that excellent results in terms of morphology and size control can be obtained by working in stage (a) under conditions such that, in the mixer, both the value of $\lambda_k$ and the Reynolds number are kept within a desired range.

The Reynolds number relating to the movement of a fluid inside a tube ($Re_T$) is defined by the formula $Re=D\cdot V\cdot d/\eta$ in which D is the diameter of the tube, V is the linear velocity of the emulsion, d is its density and $\eta$ is the dynamic viscosity. Generally, values of Re below 2000 correspond to laminar flow, while values of Re above 4000 correspond to turbulent flow. The zone between 2000 and 4000 is the so-called transition zone. The type of flow of a liquid inside a mixer is described by the modified Reynolds number ($Re_M$) which is defined by the formula $Re=NL^2\cdot d/\eta$ in which N is the number of revolutions of the stirrer per unit time, L is the characteristic length of the stirrer while d and $\eta$ have the meanings given above.

It will be clear to a person skilled in the art that the value of $Re_M$ may be selected by choosing the most appropriate combination of parameters as necessary. In particular, it will be possible to vary both the specific parameters of the emulsion (density, viscosity and thus also the type of continuous phase) and the operating parameters such as the type and dimensions of container, the type and dimensions of the stirrer, the number of revolutions and the temperature and pressure. In the specific case of an emulsion comprising MgCl$_2$-alcohol adducts as the dispersed phase and paraffin oil or silicone oil as the continuous phase, it has been found particularly advantageous by working in the mixer at $Re_M$ values between 10,000 and 80,000, preferably between 15,000 and 50,000 and even more preferably between 15,000 and 30,000.

By way of example, it is reported that good results were obtained by forming the emulsion at a temperature of between 110° C. and 130° C., with an emulsion having a viscosity of between 4.5 and 8 cSt, a density of between 0.82 and 0.9 g/cm$^3$, and stirring the mixture at a speed of between 500 rpm and 2500 rpm.

As mentioned above, the formed emulsion is then transferred into the cooling bath. The transfer is preferably carried out under pressure, by using a pipe connected at one end with the cooling bath. The diameter of said pipe is such that the Reynolds number in the pipe ($Re_T$) is higher than 3000, preferably between 3000 and 10000. In any case, the skilled man in the art knows that the value of $Re_T$ may be suitably increased or decreased, as a consequence of the value of $Re_M$ selected in the mixer.

The pipe length to connect step a) and b) may be varied within a wide range, bearing in mind, the operating limits caused, on the one hand, by the substantial pressure drops and, on the other hand, by the compactness of the plant.

As mentioned previously, the emulsion is then solidified in the cooling step (b). The cooling step is carried out by immersing one of the ends of the transfer pipe containing the emulsion in the cooling bath wherein the cooling liquid is moving inside a tubular zone. According to the present invention the term "tubular zone" has the ordinary meaning of a zone having the form of a tube. Particularly preferred examples of such zones are pipes or tubular reactors. On coming into contact with the low-temperature liquid, the emulsion containing the droplets of the molten adduct is cooled, bringing about solidification of the droplets in solid particles, which can then be collected for example by means of centrifugation or filtration. The cooling liquid may be any liquid which is inert with respect to the adduct and in which the adduct is substantially insoluble. For example, this liquid can be selected from the group consisting of aliphatic and aromatic hydrocarbons. Preferred compounds are aliphatic hydrocarbons containing from 4 to 12 carbon atoms and in particular hexane and heptane. A cooling liquid temperature of between −20° C. and 20° C. gives satisfactory results in terms of rapid solidification of the droplets. In the case of the adduct MgCl$_2$·nEtOH, in which n is between 2 and 4, the cooling liquid temperature is preferably between −10° C. and 20° C. and more preferably between −5° C. and 15° C.

In a preferred embodiment of the present invention, the cooling bath consists of a loop reactor wherein the cooling liquid is circulated, the angle α formed by the direction of entry of the emulsion in the loop and by the direction of flow of the cooling liquid is less than 45° and preferably less than 20°.

FIG. 1 is a schematic representation of one of the embodiments of the process according to the present invention.

A MgCl$_2$-alcohol adduct is introduced into a vessel 1 via line 21, while a liquid medium used as the continuous phase is introduced into vessel 1 via line 22. The vessel is equipped with a stirrer 4, a pressurization gas inlet tube 5 and a heating jacket 6 which has a heating fluid entry tube 7 and an exit tube 8. By pressurizing the vessel 1, the emulsion flows into the pipe 14, then the emulsion enters the cooling bath 15, which is equipped with a stirrer 16 and a tubular zone 20 wherein the cooling liquid is forced to flow by the action of the stirrer 16.

A cooling liquid contained in the reservoir 23 enters the cooling bath 15 via the pipe 26. A refrigerant circulates in the jacket 17 entering via the tube 18 and coming out via the tube 19. The dispersion containing the solid particles of the MgCl$_2$-alcohol adduct is withdrawn from the cooling bath via the tube 24.

Figure 2:
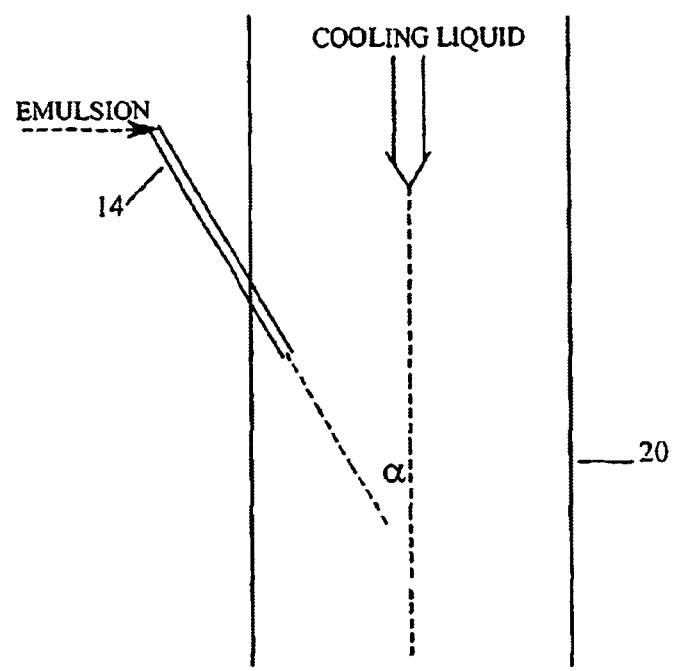
FIG. 2 illustrates a quenching step used in the process to prepare spheroidal support particles.

In FIG. 2 it is represented the quenching step according to the present invention. The cooling liquid flows inside a tubular zone 20, while the emulsion enters the tubular zone 20 via a pipe 14. The angle α formed between the pipe 14 and the axis of the tubular zone is less than 25° and the ratio $V_e/V_{ref}$ is about 1.

As described previously, the supports prepared by the process of the present invention are particularly suitable for preparing catalytic components for the polymerization of olefins. The said catalyst components are obtainable by reacting a transition metal compound of formula MP$_x$, in which P is a ligand that is coordinated to the metal and x is the valence of the metal M which is an atom selected from the Groups 3 to 11 or the lanthanide or actinide groups of the Periodic Table of the Elements (new IUPAC version), with the supports of the invention. Particularly preferred transition metal compounds are Ti and V halides, alcoholates or haloalcoholates. Other preferred transition metal compounds are the homogeneous ones such as those described in EP 129 368 or the mono-cyclopentadienyl catalyst systems such as those described in EP 416,815 and EP 420,436. Further homogeneous catalytic systems that can be supported are those based on late transition metal complexes such as those described in WO 96/23010.

In particular, the components obtained by the said supports maintain the spherical morphology and the narrow size distribution and, as can be seen in the examples given, are capable of producing, when used in the (co)polymerization of olefins, polymers of high apparent density, with excellent flow properties and controlled size distribution. The examples which follow are given as non-limiting illustrations of the invention.

EXAMPLES

Example 1

208 g of a molten adduct of formula MgCl$_2$·2.7EtOH and 900 g of a white mineral oil OB55 marketed by ROL OIL are introduced into a jacketed container equipped with a stirrer. The mixture is kept under stirring at a temperature of 125° C. The stirring speed is such that the Re$_M$ value in the mixer is 17,000.

The container is then pressurized and the emulsion is transferred into a pipe, maintained at a temperature of 125° C., in which it flows with a Re of 3230. The pipe transfers the emulsion into a cooling bath containing hexane which flows in a tubular zone at a temperature of 12° C. The direction of entry of the emulsion and that of flow of the cooling hexane forms an angle of 25°, while the ratio between the velocity of the emulsion (V$_e$) and the velocity of the cooling hexane (V$_{ref}$) is 0.5.

The solid adduct particles are collected by filtration and dried. The results of the characterization in terms of morphological properties and size distribution are given in Table 1.

In Table 1 the particle size distribution is calculated according to the formula $$\frac{P90 - P10}{P50},$$

wherein P90 is the value of the diameter such that 90% of the total particles have a diameter lower than that value; P10 is the value of the diameter such that 10% of the total particles have a diameter lower than that value and P50 is the value of the diameter such that 50% of the total particles have a diameter lower than that value.

The term "spherical" in Table 1 means particles having a ratio between maximum diameter and minimum diameter of less than 1.3.

Example 2

138 g of a molten adduct of formula MgCl$_2$·2.7EtOH and 800 g of white mineral oil OB55 are introduced into a jacketed container equipped with a stirrer. The mixture is kept under stirring at a temperature of 125° C. The stirring speed is such that the Re$_M$ value in the mixer is 14,000.

The container is then pressurized and the emulsion is transferred in a pipe, maintained at a temperature of 125° C., in which it flows with a Re of 3140. The pipe transfers the emulsion into a cooling bath containing hexane at a temperature of 10° C., flowing in a tubular zone according to FIG. 1. The direction of entry of the emulsion and that of the flow of the hexane form an angle of 15°, while the ratio between the velocity of the emulsion (V$_e$) and the velocity of the cooling hexane (V$_{ref}$) is 1.

The solid adduct particles are collected by filtration and dried. The results of the characterization in terms of morphological properties and size distribution are given in Table 1.

Example 3

165 g of a molten adduct of formula MgCl$_2$·2.7EtOH and 900 g of white mineral oil OB55 are introduced into a jacketed container equipped with a stirrer. The mixture is kept under stirring at a temperature of 125° C. The stirring speed is such that the Re$_M$ value in the mixer is 20,000.

The container is then pressurized and the emulsion is transferred into a pipe, maintained at a temperature of 125° C., in which it flows with a Re of 3480. The pipe transfers the emulsion into a cooling bath containing hexane at a temperature of 12° C. flowing in a tubular zone according to FIG. 1. The direction of entry of the emulsion and that of flow of the cooling hexane form an angle of 25°, while the ratio between the velocity of the emulsion (V$_e$) and the velocity of the cooling hexane (V$_{ref}$) is 1.2

The solid adduct particles are collected by filtration and dried. The results of the characterization in terms of morphological properties and size distribution are given in Table 1.

Example 4

97 g of a molten adduct of formula MgCl$_2$·2.7EtOH and 900 g of white mineral oil OB55 are introduced into a jacketed container equipped with a stirrer. The mixture is kept under stirring at a temperature of 125° C. The stirring speed is such that the Re$_M$ value in the mixer is 67,000.

The container is then pressurized and the emulsion is transferred into a pipe, maintained at a temperature of 125° C., in which it flows with a Re of 7915. The pipe transfers the emulsion into a cooling bath containing hexane at a temperature of 10° C. flowing in a tubular zone according to FIG. 1. The direction of entry of the emulsion and that of flow of the cooling hexane form an angle of 20°, while the ratio between the velocity of the emulsion ($V_e$) and the velocity of the cooling hexane ($V_{ref}$) is 1.5.

The solid adduct particles are collected by filtration and dried. The results of the characterization in terms of morphological properties and size distribution are given in Table 1.

Comparative Example 5

A solid adduct of formula $MgCl_2 \cdot 2.7EtOH$ was prepared according to the procedure of Example 3, except that a ratio between the velocity of the emulsion ($V_e$) and the velocity of the cooling hexane ($V_{ref}$) equal to 5 was used. The results of the characterization in terms of morphological properties and size distribution are given in Table 1.

Example 6
Preparation of the Solid Component 800 cm³ of $TiCl_4$ at 0° C. were loaded into a 1-litre steel reactor equipped with a stirrer; 16 g of the solid adduct prepared according to Example 3 and an amount of diisobutyl phthalate such as to give a donor/Mg ratio of 10 were then introduced while keeping the system stirred. The mixture was heated to 100° C. over 90 min. and these conditions were maintained for 120 min. The stirring was then stopped and, after 30 min., the liquid phase was separated from the sedimented solid at a temperature of 100° C. A further treatment of the solid was carried out by adding 750 cm³ of $TiCl_4$, heating the mixture to 120° C. for 10 min. and maintaining these conditions for 60 min. with stirring. The stirring was then stopped and, after 30 min., the liquid phase was separated from the sedimented solid at a temperature of 120° C. The solid obtained was washed 3 times with anhydrous hexane at 60° C. and 3 times with anhydrous hexane at room temperature. The solid catalytic component thus obtained was then dried under vacuum under a nitrogen atmosphere at a temperature of between 40° C. and 45° C.

Polymerization Test

A steel autoclave equipped with a stirrer, a manometer, a thermometer, supply lines for introducing the monomers, a system for loading the catalyst and a thermostatically-controlled jacket was loaded with 0.01 g of the solid component prepared as described previously, 0.76 g of triethylaluminium (TEAL), 0.0767 g of dicylopentyldimethoxysilane, 3.21 of propylene and 1.51 of hydrogen. The system was heated to 70° C. over 10 min. with stirring and maintained under these conditions for 120 min. At the end of the polymerization, the polymer was recovered by removing the unreacted monomer, and was dried under vacuum. The results of the polymerization are given in Table 2.

Comparative Example 7
Preparation of the Solid Component

The solid component was prepared according to the procedure described in Example 6, except that 16 g of the support prepared according to Comparative Example 5 were used.

Polymerization Test

The polymerization was carried out as described in Example 6, using the solid catalytic component described above. The results of the polymerization are given in Table 2.

TABLE 1

|  | Example 1 | Example 2 | Example 3 | Example 4 | Comparative Example 5 |
| --- | --- | --- | --- | --- | --- |
| Morphology | spherical | Spherical | Spherical | spherical | Irregular |
| Particle size distribution | 0.9 | 0.7 | 1 | 1.1 | 1.5 |

TABLE 2

|  | Example 6 | Comparative Example 7 |
| --- | --- | --- |
| Activity (Kg PP/g cat.) | 80 | 70 |
| Apparent density (g/cm³) | 0.45 | 0.43 |

What is claimed is:

1. A process for preparing spheroidal support particles comprising the steps of:
    (a) forming an emulsion of an adduct of a Mg dihalide and a Lewis base in a liquid medium which is inert with respect to the adduct, and
    (b) cooling the emulsion by transferring it into a cooling bath containing a cooling liquid in motion,
wherein the cooling liquid is moving inside a tubular zone and the ratio $V_e/V_{ref}$ of the velocity ($V_e$) of the emulsion coming from step (a) to the velocity of the cooling liquid ($V_{ref}$) of step (b) is between 0.25 and 4.

2. The process according to claim 1 wherein the ratio $V_e/V_{ref}$ is between 0.5 and 2.

3. The process according to claim 2 wherein the ratio $V_e/V_{ref}$ is between 0.75 and 1.5.

4. The process according to claim 1 wherein the angle α formed by the direction of entry of the emulsion into the cooling bath and by the direction of flow of the cooling liquid inside the tubular zone is less than 45°.

5. The process according to claim 4 wherein the angle α is less than 35°.

6. The process according to claim 5 wherein the angle α is less than 20°.

7. The process according to claim 6 wherein the ratio $V_e/V_{ref}$ is from 0.75 to 1.5.

8. The process according to claim 1 wherein the liquid medium, which is inert with respect to the adduct, is selected from the group consisting of aliphatic and aromatic hydrocarbons, silicone oils, liquid polymers or mixtures of these compounds.

9. The process according to claim 8 wherein the liquid medium is a paraffin oil or a silicone oil having a viscosity between 30 cSt and 300 cSt at room temperature.

10. The process according to claim 1 wherein the Lewis base is an alcohol of formula ROH in which R is an alkyl group containing from 1 to 10 carbon atoms.

11. The process according to claim 1 wherein the Mg dihalide is $MgCl_2$.

12. The process according to claim 1 wherein the adduct has a formula $MgCl_2 \cdot mROH \cdot nH_2O$ in which m ranges from 0.1 to 6, n ranges from 0 to 0.7 and R is an alkyl group containing from 1 to 10 carbon atoms.

13. The process according to claim 12 wherein m ranges from 2 to 4, n ranges from 0 to 0.4 and R is ethyl.

14. The process according to claim 1 in which the step (a) is carried out in a mixer.

15. The process according to claim 14 wherein the $\lambda_k$ value of the emulsion formed in step (a) is between 5 μm and 150 μm.

16. The process according to claim 15 wherein in step (a) the value of $Re_M$ is in the range from 10,000 to 80,000.

17. The process according to claim 16 wherein $Re_M$ is in the range from 15,000 to 50,000.

18. The process according to claim 1 wherein the emulsion formed in step (a) is transferred into the cooling bath by using a pipe connected to the cooling bath at one end.

19. The process according to claim 18 wherein the transfer is carried out under conditions such that the Reynolds number in the pipe is higher than 3,000.

20. The process according to claim 1 wherein the cooling liquid is selected from the group consisting of aliphatic and aromatic hydrocarbons.

21. The process according to claim 20 wherein the temperature of the cooling liquid in the cooling bath is in the range from −20° C. to 20° C.

22. The process according to claim 1 wherein the cooling bath consists of a loop reactor in which the cooling liquid is circulated and the angle α formed by the direction of entry of the emulsion in the loop and by the direction of flow of the cooling liquid is less than 45°.

23. The process according to claim 2 wherein the angle α formed by the direction of entry of the emulsion into the cooling bath and by the direction of flow of the cooling liquid inside the tubular zone is less than 45°.

24. The process according to claim 3, wherein the angle α formed by the direction of entry of the emulsion into the cooling bath and by the direction of flow of the cooling liquid inside the tubular zone is less than 45°.

25. The process according to claim 21 wherein the temperature of the cooling liquid in the cooling bath is in the range from −5° C. to 15° C.

26. The process according to claim 22 wherein the cooling bath consists of a loop reactor in which the cooling liquid is circulated, the angle α formed by the direction of entry of the emulsion in the loop and by the direction of flow of the cooling liquid is less than 20°.

27. Spheroidal support particles obtained by the process according to claim 1.

28. The spheroidal support particles of claim 27 wherein an adduct of the formula $MgCl_2 \cdot mROH \cdot nH_2O$ in which m ranges from 0.1 to 6, n ranges from 0 to 0.7 and R is an alkyl group containing from 1 to 10 carbon atoms and which has a particle size distribution according to the formula $$\frac{P90 - P10}{P50}$$

of less than 1.1 is used in the process.

29. Catalyst components for the polymerization of olefins obtained by reacting a transition metal compound of formula $MP_x$ with the spheroidal support particles according to claim 27 wherein M is a metal selected from the Groups 3 to 11 or the lanthanide or actinide groups of the Periodic Table of the Elements (new IUPAC version), P is a ligand coordinated to the metal M and x is the valence of the metal M.

* * * * *